Aug. 31, 1965   C. LORENZEN ETAL   3,203,430
SEPARATING CONVEYOR FOR A TOMATO HARVESTER
Original Filed Sept. 28, 1960   11 Sheets-Sheet 1

Fig. 1

INVENTORS
COBY LORENZEN
ISTVAN J. SZLUKA
FREDRICK L. HILL
BY
ATTY

INVENTORS
COBY LORENZEN
ISTVAN J. SZLUKA
FREDRICK L. HILL

ATTY.

United States Patent Office 3,203,430
Patented Aug. 31, 1965

3,203,430
SEPARATING CONVEYOR FOR A TOMATO HARVESTER
Coby Lorenzen and Istvan J. Szluka, Davis, and Frederick L. Hill, Rio Vista, Calif., assignors to The Regents of The University of California, Berkeley, Calif.
Original application Sept. 28, 1960, Ser. No. 59,031. Divided and this application May 31, 1963, Ser. No. 289,160
6 Claims. (Cl. 130—30)

This invention relates to a tomato harvester. This application is a division of application Serial No. 59,031, filed September 28, 1960.

The cost of harvesting tomatoes by hand has risen so rapidly in recent years that the growers have yearned for mechanized harvesting. In 1960 the fall tomato harvest in California alone required about 53,000 workers for a short period of time. The present invention makes it possible to harvest the crop with only one-fifth as many laborers, so that a tremendous number of man hours can be saved— and that at a time when cheap farm labor has become a thing of the past. With one man operating the harvester of this invention, four to twelve laborers doing the sorting, one conveyor operator, two tractor operators and one forklift operator, these nine to seventeen men can do the work of sixty men working under the old system of picking and re-picking.

In the past, tomato growers faced three big problems: (1) tomatoes ripened unevenly, requiring two or more pickings of the fields and causing a loss of at least one-fourth of the harvest, and (2) a very large labor force was required suddenly and quickly and was used for only a short period of time, and (3) the growers have realized only about half of the potential yield of their fields, considering all the rejection losses.

The problem of uneven ripening of tomatoes has received the attention of plant breeders. Professor G. C. Hanna of the Department of Vegetable Crops of the University of California at Davis has bred a special strain of tough-skinned tomato which ripens very uniformly. This variety is planned for commercial introduction soon. In the meantime, about 11% of the total tomato crop is made up of tomatoes presently suitable for mechanical harvesting. There is every expectation that the introduction of Professor Hanna's new varieties will raise that percentage rapidly.

However, even though this substantial percentage of tomatoes is capable (by virtue of ripening conditions, of proper stem breakage at the fruit, of tough enough skin, and other factors) of mechanical harvesting, there has not been any satisfactory means of harvesting tomatoes mechanically. A considerable number of problems had to be solved, and the present invention solves them.

Thus, a basic object of this invention is to provide method and apparatus for mechanically harvesting tomatoes. This object the invention achieves by mechanically taking the whole vine up from the field and shaking the tomatoes off. Then the tomatoes are separated from the leaves, dirt, and other matter, sorted, and loaded into bulk bins.

While this may sound simple, it is effective, and the attainment of this basic method has been achieved, but only by solving at each stage serious problems that at first seemed insuperable. How was the tomato plant to be gotten off the ground? How could this be done without damaging, shaking off, or losing many tomatoes while doing so? How could the elevated vine then be shaken? How could it be shaken so as to get all the ripe tomatoes off while not shaking off too many leaves or unripe tomatoes and other undesired things? How could the shaken-off tomatoes be separated from such leaves, dirt, etc., as were shaken off with them? How could the dimensions of the machine be held to practical limits? How could sorting, grading, and packing be efficiently tied into this type of harvest? All these questions state problems that had to be—and were—solved in order to arrive at this invention. All of them so clearly imply objects of the invention that these objects need not be restated in direct terms.

Briefly, this is how the harvester of this invention works: (a) a cutting device cuts the vine's main stem, preferably at root level; (b) a tine pickup lifter gently elevates the vine to a shaking device; (c) at the shaking device, rubber-covered walking bars mounted in two sets on crankshafts agitate and advance the vine along the bars. Preferably, the shaking device is novelly constructed to provide a gradually increasing shaking force as the vine moves from one end of the shaker to the other; (d) the vine carried to the end of the shaking device falls to the ground through an open chute; (e) the tomatoes removed by the shaker fall directly onto a specially agitated de-leafing conveyor, which is mounted on an incline moving rearwardly and upwardly; (f) the de-leafing conveyor carries leaves, trash, and dirt up to the open chute where they fall through with the vines; (g) the tomatoes roll down the de-leafing conveyor and are cross-conveyed to sorting belts; (h) the tomatoes are visually sorted by hand at the rear of the machine, as the sorting belts move them rearwardly; (i) the sorted tomatoes are conveyed into bulk bins, preferably located on a trailer being pulled parallel to the harvester; and (j) the packed tomatoes are then hauled away in the bins by trucks.

Further explanation of each step and stage, together with further exposition of the problems encountered will be given in, and other objects and advantages of the invention will appear from, the following detailed description of a preferred embodiment of the invention.

The tomato harvester of this invention may have a main frame 20 supported on front wheels 21 and rear wheels 22. The frame 20 carries an engine or self-propelling means 23, a driver's seat 24, and driving and steering controls 25. The main frame 20 also supports, looking from front to rear, a cutting means 26, a lifting means 27, a shaking means 28, and a sorting station 29. Each of these elements will be described in detail and their connection to each other explained.

The cutting means 26 (FIGS. 1–6)

An important feature of the combination of this invention is the provision at the forward end of the device of means 26 for automatically cutting off each tomato plant in the path of the machine. The cut is made at, below, or above ground level, depending on the conditions encountered, as will be explained below, and the cut is made without shaking off or cutting into the tomatoes carried by the vine.

Figure 1:
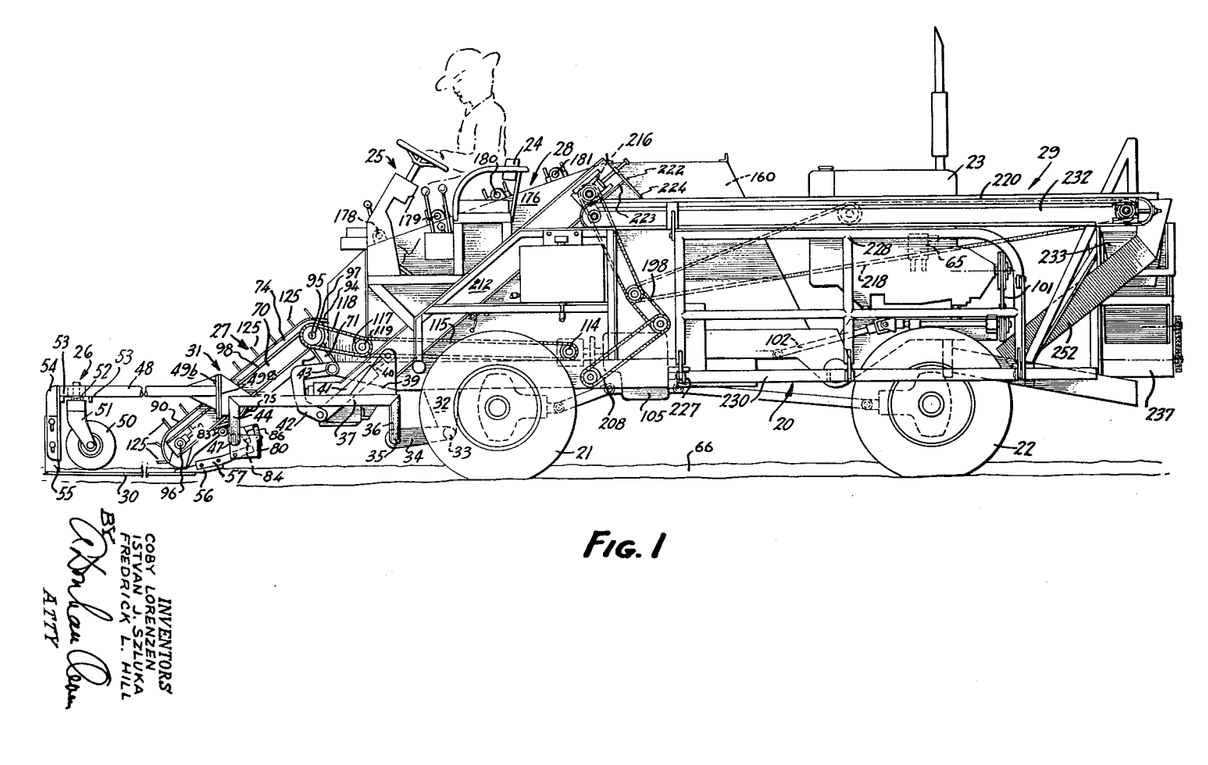
FIG. 1 is a view in side elevation of a tomato harvesting machine embodying the principles of the invention. A portion of the cutting means is broken to conserve space.
Figures 2, 5:
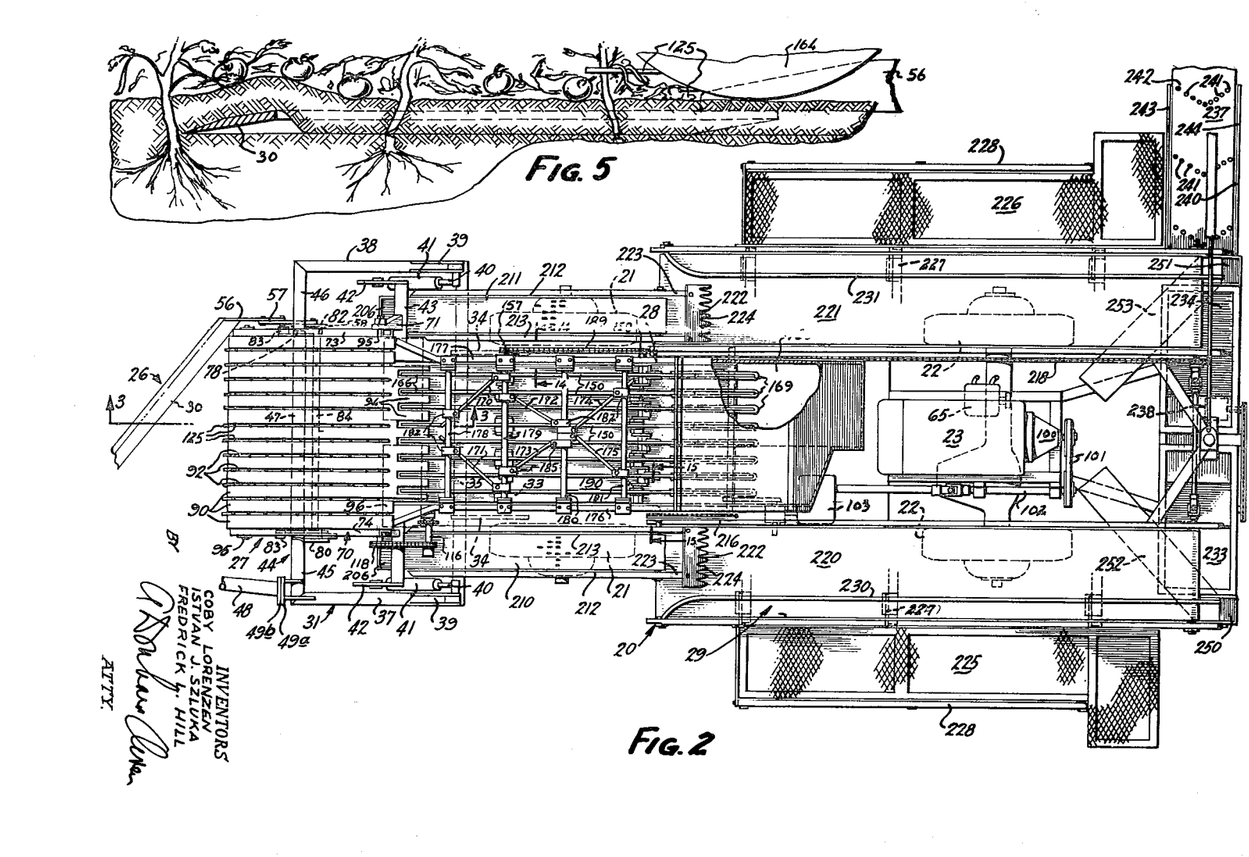
FIG. 2 is a top plan view of the machine of FIG. 1 with the driver's seat and the controls omitted for the sake of clarity. The boom conveyor at the rear is cut off to conserve space, and the cutting means is again broken as in FIG. 1.
FIG. 5 is a fragmentary view in section of the knife blade in cutting position, beneath the ground.
Figures 3, 4:
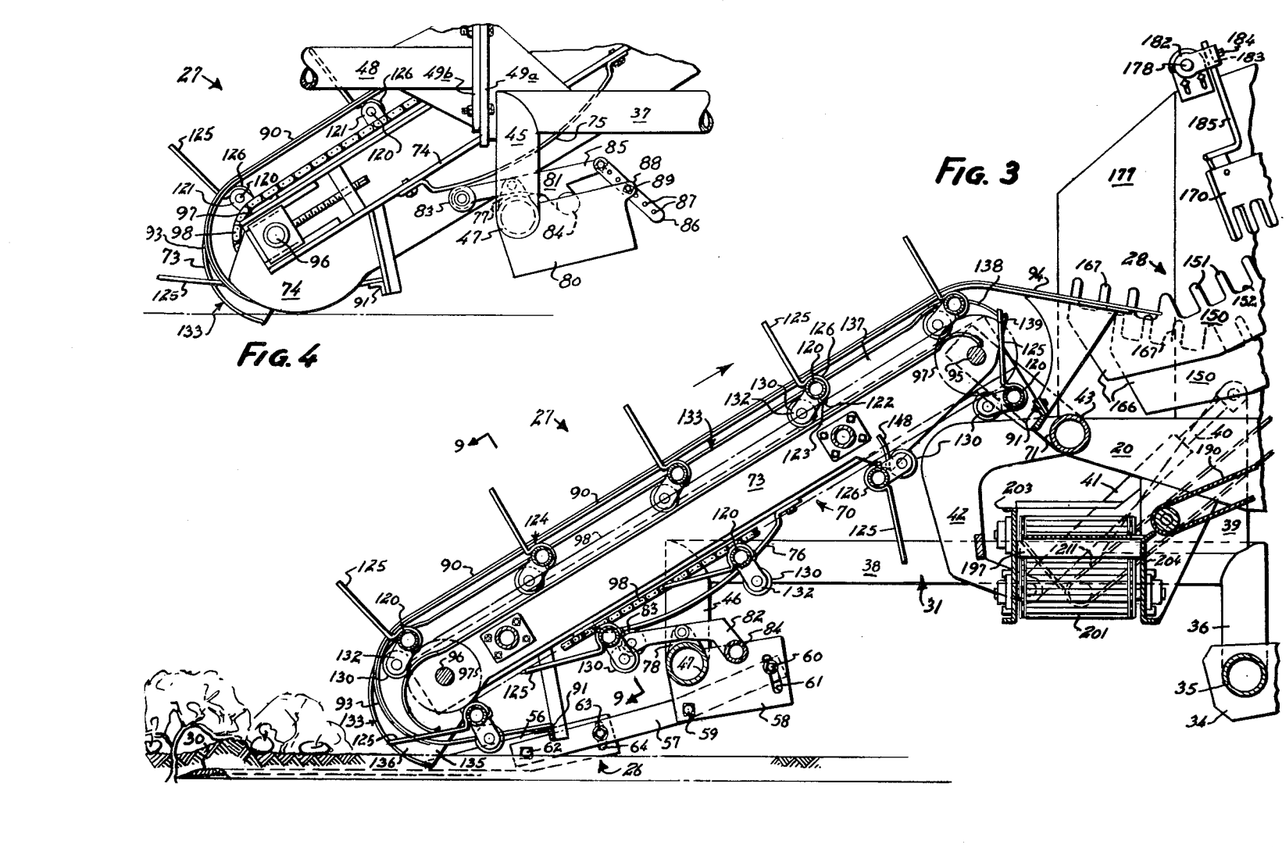
FIG. 3 is a fragmentary enlarged view in section of the forward portion of the machine, taken along the line 3—3 in FIG. 2.
FIG. 4 is an enlarged view in side elevation and partly in section of a portion of FIG. 3 near its front end.
Figure 10:
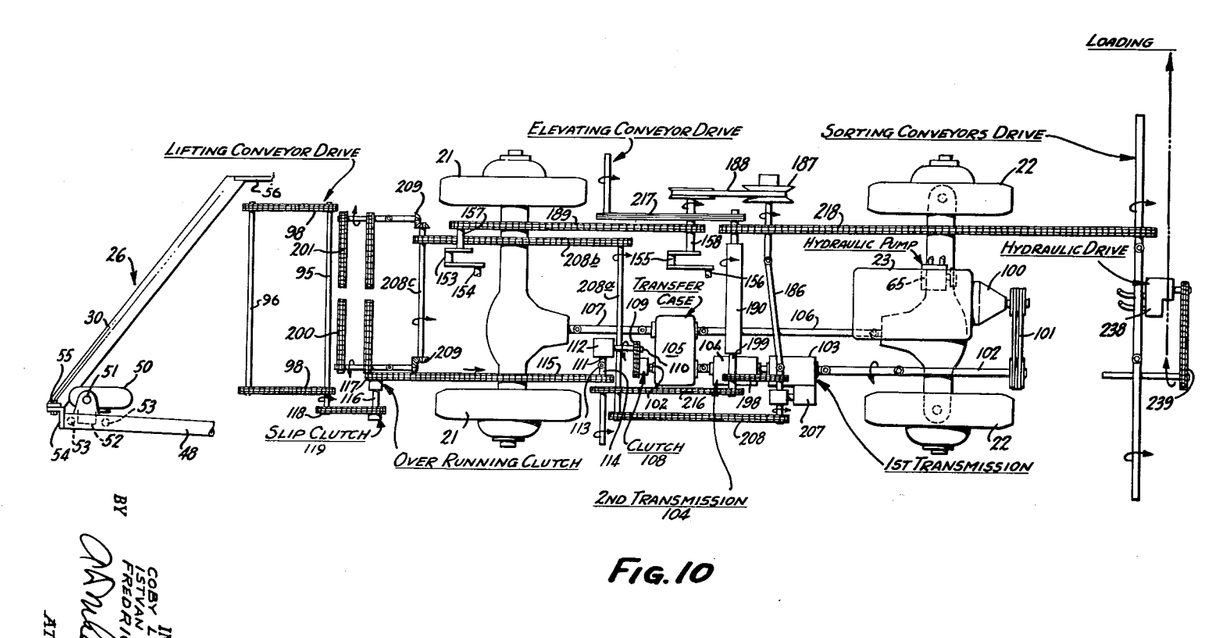
FIG. 10 is a diagrammatic plan view showing the drive mechanism for the lifting means and the wheels.
Figures 11, 12:
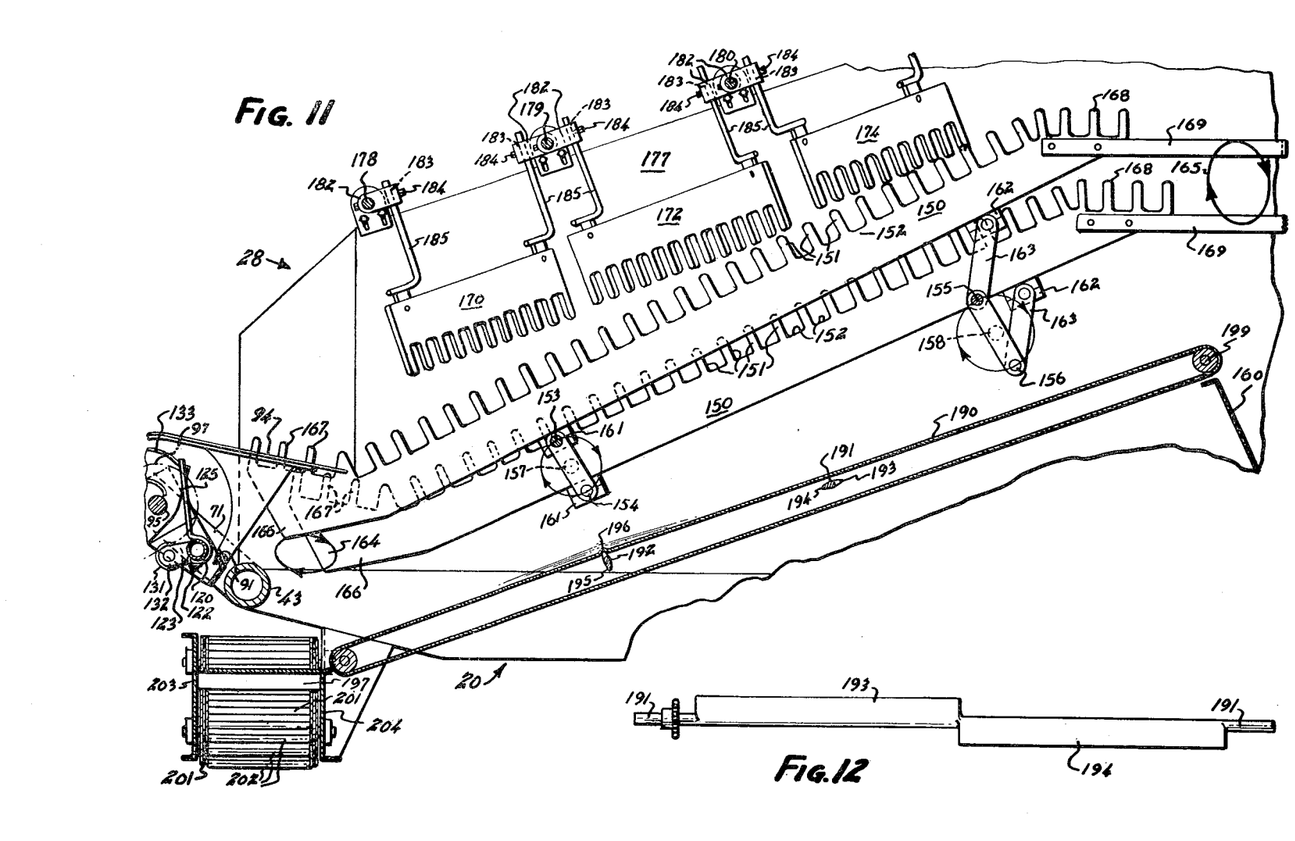
FIG. 11 is a fragmentary view in side elevation and partly in section of the shaker-walker and adjacent portions of the machine.
FIG. 12 is a top plan view of an agitator bar for the de-leafing conveyor.

One satisfactory cutter assembly 26 is shown in FIGS. 1 to 3. Here, a blade 30 is supported parallel to the ground by a frame 31 that is pivotally mounted on the forward end of the main frame 20. For this purpose, the main frame 20 may have a pair of depending brackets 32 (see FIG. 1), preferably just forward of the axles for the wheels 21, in which is journaled a shaft 33 that is a rigid and integral portion of the frame 31. The shaft 33 is connected (FIGS. 1 and 2) by a pair of arms 34 to a reinforcing cross member 35 that has two outwardly, upwardly, and forwardly extending portions 36 rigidly connected to a pair of forwardly extending frame members 37 and 38 (FIGS. 1–3). Each frame member 37 and 38 has an upwardly extending bracket 39, to which is pivotally secured a piston rod 40 of an hydraulic cylinder 41. The cylinder 41 is pivotally secured at its other end to a crank-like stationary extension 42 of the frame 20, the two extensions 42 being braced by a stationary cross member 43. Thus, when fluid is provided to the cylinder 41, the piston rod 40 moves upwardly, out from the cylinder 41, and swings the frame 31 about its pivot shaft 33, raising the forward end of the frame 31, including the knife blade 30. The fluid for the cylinder 41 may be supplied by a hydraulic pump 65 that is driven by the engine 23 (FIGS. 1 and 10).

The members 37 and 38 of the frame 31 are joined together rigidly by a cross member 44, comprising inclined end portions 45 and 46 joined rigidly by a straight cylindrical center portion 47 (see FIGS. 1–4). Adjacent the juncture of the portions 37 and 45 is a forwardly extending and inwardly inclined extension 48 secured to the frame member 37 by means of plates 49a and 49b having bolts and slotted openings to enable vertical adjustment of the extension 48 relative to the frame member 37. At the forward end of the extension 48 is a gage wheel 50 that is supported as a caster by a yoke 51, with its free caster movement limited to about 15° relative to the front-to-rear axis by a projection 52 on the yoke 51 and a pair of stops 53 on the extension 48.

A bracket 54 depending from the forward end of the extension 48 (FIGS. 1 and 2) has vertical bolt slots enabling vertical adjustment of the leading end of the knife 30, which has an upwardly extending bracket 55 that is bolted to the bracket 54 at the desired height. The trailing end of the blade 30 has an upwardly and rearwardly inclined bracket 56 (FIGS. 2 and 3, especially) that is adjustably mounted on a bracket 57, which is adjustably secured relative to the cross member 44. The cross member 44 rigidly supports a bracket 58, to which the bracket 57 is pivotally secured by a pivot pin 59, the relative position of the bracket 57 being adjusted by a bolt 60 and slot 61 in the bracket 58. The bracket 56 is pivotally mounted on the bracket 57 by a pivot pin 62, and a bolt 63 and a slot 64 in the bracket 57 regulate the relative positions of the brackets 56 and 57. These dual pivots and bolt-slot arrangements make it possible to raise the trailing end of the blade 30 to correspond to the setting on the leading end of the blade. Thus, the knife blade 30 can be raised and lowered with respect to the gage wheel 50, by means of the brackets 54 and 55 and the brackets 56, 57, and 58, and the gage wheel 50 can be raised and lowered with respect to the frame portions 37 and 38 by adjusting the vertical position of the arm 48 relative to the frame member 37.

The gage wheel 50 rides in a furrow during operation. With loose soil and where the tomatoes are growing low on the vine or even resting on the ground, the knife blade 30 is set to move below ground, up to three inches or so below the ground level. With hard soil and vines that hold their fruit high, the knife 30 may be above ground. The adjustment is made so that the vine is cut off smartly without undue impact and resultant shaking and without uprooting and thereby shaking the vine. For movement below ground, the knife blade 30 is preferably with its forward edge downwardly inclined (FIG. 5) at about 5° to 7°, or in some instances up to about 15°. The angle may depend somewhat on the type of soil encountered, but in any event the purpose of the tilt is to keep the knife moving at a constant depth, with no tendency either to move sharply down deeper or to rise to the top of the ground. The intention is to cut off the stems above the branching roots, as well as below the ground; so it is important to have this forward tilt to provide the needed equalization of the forces resulting from the forward movement of the knife 30 and its engaging the ground and stems.

Figures 6, 7, 8:
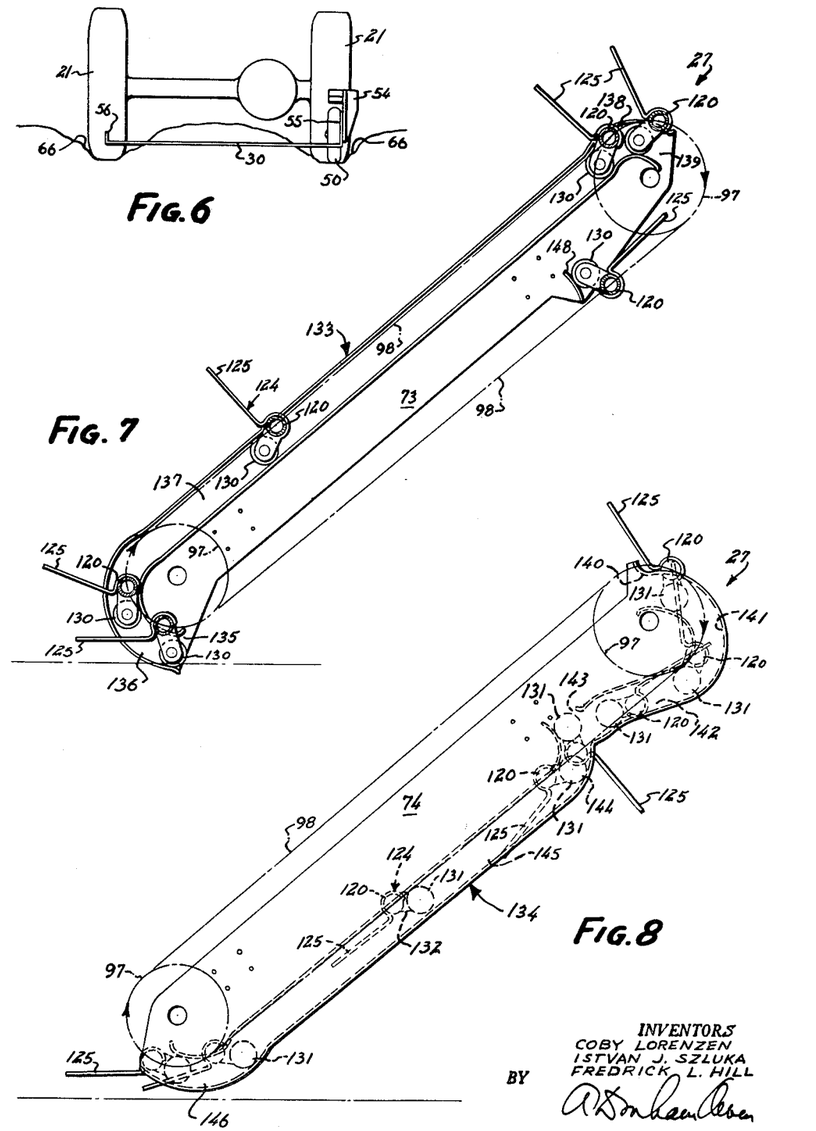
FIG. 6 is a diagrammatic view in end elevation illustrating the relationship of the blade to the ground.
FIG. 7 is a somewhat diagrammatic view in side elevation of the cam-supporting portion of the left frame member of the lifting means and the cam path thereon, showing the cam there and illustrating several positions of the fingers as their cam rollers move around their loop.
FIG. 8 is a similar view of the right-hand side frame member and its cam.
Figure 9:
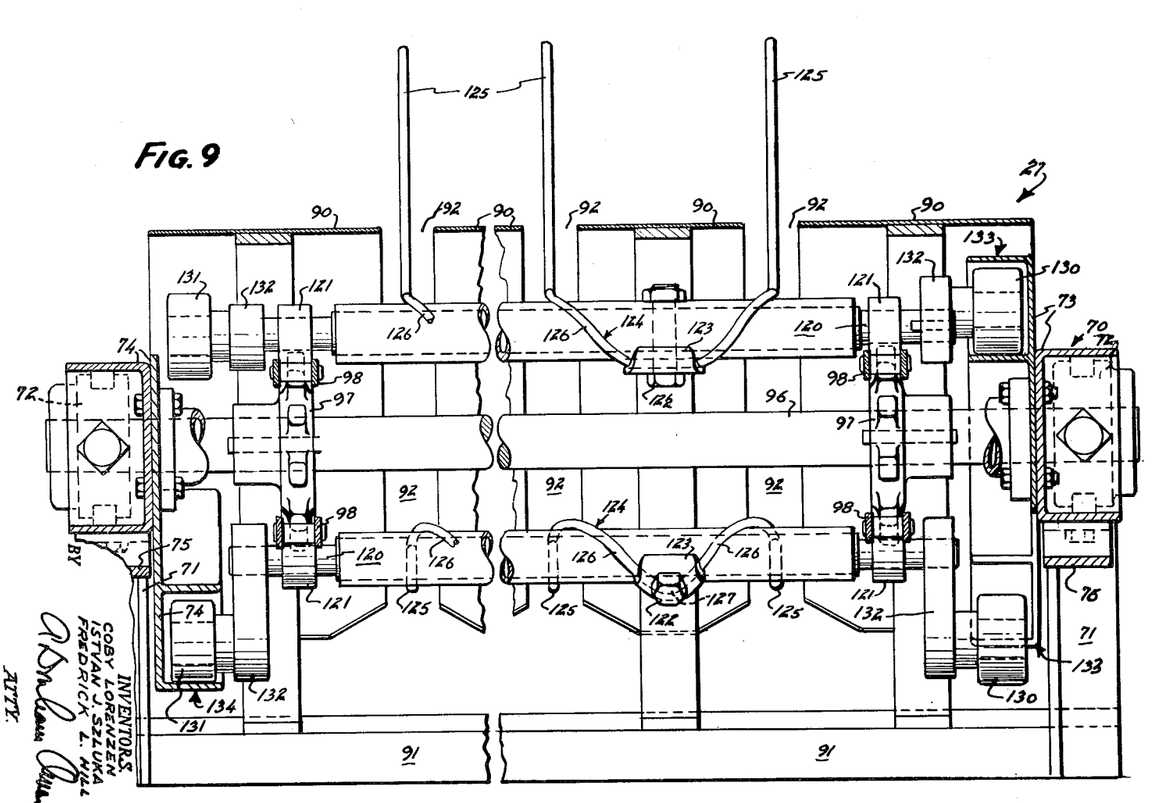
FIG. 9 is an enlarged fragmentary view in end elevation and in section of the lifting means, taken along the line 9—9 in FIG. 3, and broken in several places to conserve space.

As shown in FIG. 6, the blade 30 preferably is wide enough to extend out into the furrows 66, and the elevator 27 is approximately the same width. The purpose is to provide enough width to pick up the entire vine, which may hang over into the furrows 66. The blade 30 thus helps to lift the sides of the vine up to the elevator 27 which, as will soon be apparent, is always kept above ground, to keep it as free from dirt as possible.

Another feature of the knife 30 is its forward inclination at about 45°, from side to side (see FIG. 2). One purpose of this is to put the blade 30 (except for the trailing end that is not underground) far enough forward so that its tendency to push up dirt in a "ground wave" does not result in sending dirt on to the elevator 27. In fact, an important characteristic of this invention is its ability to keep the elevator 27 above ground and thus to be able to cut the vine under ground while keeping the elevator 27 relatively clean, even in loam or clay soils.

The lifter 27 (FIGS. 1–4 and 7–10)

The lifting means or vine elevator 27 includes a frame 70. The rigid cross member 43 on the main frame 20 is provided with a pair of brackets 71 in which bearings 72 of the frame 70 are pivotally supported. The frame 70 has two longitudinally extending members 73 and 74, each of which has a depending, cammed rest support 75, 76. The cross member 44 of the cutter frame 31 is provided with a pair of ears 77, 78, one on each end of its central portion 47, and on the end where it meets the portion 45 has a vertical plate 80 rigidly secured in place. At each ear 77, 78, a crank 81, 82 is pivotally supported. At the forward end of each crank 81, 82 is a freely rotating roller 83 on which the cammed support 75, 76 rides. At the rear end of each crank 81, 82 is a reinforcing cross member 84, joining the two cranks 81, 82 together as a single rigid piece. The crank 81 also has a rear extension 85 that is bolted to one end of a multi-perforated link 86 having a plurality of holes 87 therethrough. The link 86 is bolted through any of these holes 87 to an ear 88 on the plate 80 by a bolt 89. This link 86 enables setting the rollers 83 at any desired height and therefore enables relative adjustment between the cutter frame 31 and the lifter frame 70.

Thus the elevator frame 70 is supported pivotally by the brackets 71 and bearings 72 and its cammed supports 75, 76 rest on the rollers 83 which are supported by the cranks 81, 82 for adjustment relative to the cutter frame 31. Therefore, whenever the cutter frame 31 is raised by the cylinders 41 and piston rods 40, the elevator frame 70 also is raised, the cams 75 and 76 riding over the rollers 83. The cutter assembly 26 and elevator assembly 27 are thus raised when the harvester is not in operation and is being moved from place to place. Moreover, the entire elevator assembly 27 is supported above ground when the device is in operation.

The elevator frame 70 (FIGS. 2, 3, and 7) includes a plurality of identical longitudinally extending guide strips 90, which are bolted side by side parallel to each other to cross members 91 and are spaced apart by gaps 92 between each pair of strips 90. Each strip 90 has an arcuate forward portion 93 at the forward end of the elevator frame 70 and has a rear inclined end portion 94 that extends over the forward end of the shaker 28, so that the tomato vines and tomatoes are carried over and onto the shaker 28. The frame 70 also supports rotatable shafts 95 and 96 (the shaft 95 being rotatable in the bearings 72). Both shafts have sprocket wheels 97 on which are mounted chains 98.

The chains 98 are driven at the forward speed of the vehicle by a setup shown in FIG. 10. The engine 23 drives, through a clutch 100 and V-belts 101, a shaft 102 which leads to a first transmission 103. The transmission 103 is connected through a second transmission 104 to a transfer case 105, whence lead the drive shaft 106 for the rear wheels 22 and the drive shaft 107 for the front wheels 21. The transfer case 105 has a drive clutch 108 and chain drive 109 to a shaft 110. The shaft 110 turns a shaft 111, by means of an angle gear box 112. The shaft 111 is connected through a universal joint 113 to a shaft 114 that drives a chain 115. The chain 115 drives a shaft 116 through an overrunning clutch 117. The clutch 117 disengages the drive for the elevator chains 98 whenever the wheels 21 are driven in reverse; in other words, the elevator 27 runs only forward. The shaft 116 drives a drive chain 118 through a safety clutch 119, a slip clutch that slips if the chain 118 stops while the shaft 116 is running, so that any obstruction of the elevator 27 will not affect the drive mechanism. The chain 118 drives the shaft 95.

Thus, the elevator chains 98 are driven at the ground speed of the frame 20 when the frame 20 is moving forward.

Between the pairs of chains 98 and moving with them are a plurality of transverse rods 120 (see FIG. 9), which are mounted for free rotation with respect to the chains 98 by means of brackets 121. The rods 120 preferably lie about three inches apart and each one is bored diametrically at loci corresponding to the center lines of every other strip 90 to receive a bolt 122. Each bolt 122 supports, with the aid of its nut and a clip 123, a tine 124 having a pair of fingers 125 and a wrap-around portion 126 having a bend 127 that is engaged by the clip 123 and held in place. Each finger 125 therefore sticks out through a gap 92, each rod 120 therefore providing a finger 125 for every gap 92, the gaps being about three inches apart. Thus, as the chains 98 are driven, the rods 120 and their tines 124 move with the chains.

Each rod 120 carries two cam rollers 130 and 131, one at each end of the rod, and mounted in an offset position with respect to the rod 120 and the axes of the fingers 125 by a bracket 132. The cam rollers 130 all follow a cam track 133 in the frame member 73, while the cam rollers 131 all follow a cam track 134 in the frame member 74.

The cam track 133 (FIG. 7) has a flared inlet 135 leading to an arcuate portion 136 at the forward and lower end of the frame member 73 and succeeded by a long, rectilinear portion 137 on the upper side of the frame member 73, extending to its upper end, where a short terminal arcuate portion 138 terminates in a slightly flared outlet 139. Thus, when a roller 130 enters the inlet 135 (its fingers 125 then extending nearly parallel to the strips 90, but below them) it moves into the arcuate portion 136 and then turns the tines 124 clockwise until they enter the rectilinear portion 137 with the fingers 125 substantially perpendicular thereto, preferably being slightly forwardly inclined. They remain in this position over the full upper run of the elevator 27.

The cam 134 (FIG. 8) has a flared inlet 140 at its upper end leading into an arcuate portion 141 at the upper end of the elevator 27. The arcuate portion 141 extends more than 180° and leads into a short inwardly inclined portion 142 having an opening 143 on the inner side and succeeded by a short arcuate portion 144 that leads to a long lower rectilinear portion 145 succeeded by a final short arcuate portion 146 having an outlet 147. The portions 146 and 141 overlap the respective portions 136 and 139 of the cam 133, so that the cam 133 takes over from the cam 134 before the cam 134 relinquishes its roller 131, and vice versa. Also, there is a very short but very important cam 148 on the frame member 73 opposite the opening 143, or rather opposite the cam wall of the portion 144 at the downward and forward side thereof. As the cam roller 131 follows the arcuate portion 141, it turns over about 90°, as shown. Then, when it reaches the opening 143, it hesitates, as the cam 148 causes the cam roller 130 to turn over 90° more; then the roller 131 follows down into the portion 144 where it turns over another 90° and enters the portion 145 almost parallel to the guide strips 90 and then continues until the cam roller 130 reaches the arcuate portion 136.

Thus the cam system moves the fingers 125 around so that they turn over 360° during their travel, but do so in such a way that they will maintain the desired relation to the elevator 27 at each point of their travel. The main thing is that they approach the ground at the forward end of the elevator 70 parallel to the strips 90, then turn as they get next to the ground to be parallel with the ground at their low point and then turn to be perpendicular to the strips 90 as they lift and carry the severed tomato vine upwardly and rearwardly along the elevator 70. Since the fingers 125 are moving at the same speed as the frame 20, they have substantially no forward or reverse speed relative to the ground, but only a vertically upward movement. Thus they gently lift the tomato plant vertically and carry it with the minimum of shaking to the upper end of the elevator 27, where they deposit it in the shaker 28.

As mentioned before, the elevator 27 is kept above ground, where the vine alone is gently lifted, and the amount of dirt that gets on to the elevator 27 is much less than in other devices of this general nature.

The shaker 28 (FIGS. 2, 3, 10, 11, and 13–15)

The shaker 28 includes a plurality of vertical parallel walking bars 150 with upwardly extending resilient fingers 151 mounted on their upper edges. The fingers preferably are integral with a resilient base 152 secured to the bars. The bars 150 produce a walking action because they are mounted eccentrically, by pairs, on diametrically opposite crank pins 153, 154, and 155, 156 of two crankshafts 157 and 158. Thus, when one bar 150 moves up, the bars 150 on each side of it move down, and so on. This subjects the vine to a shaking action that bounces the vines and shakes the tomatoes off the vine. The vine then walks up the bars 150 until at their upper end it falls into an open hopper 160 that extends all the way through the machine and deposits the vines on the ground.

The effectiveness of the walking bars 150 in removing fruit from the vines of any particular breed of tomato varies with the rotational speed of the crankshafts 157 and 158, as well as with their throw. The speed may be varied to yield the optimum recovery of ripe fruit for any particular variety or size of vine. For example, about 190 r.p.m. has worked well on some crops.

Preferably, the shaker 28 of this invention has a special novelty in that the upper end of the shaker shakes with a greater vertical amplitude than the lower end and also with a greater forward movement. Each bar 150 has two depending ears 161, 162, one for each crankshaft 157, 158. The ears 161 are connected directly and pivotally to their crank pins 153 or 154, but the ears 162 are pivotally connected to a link 163, which in turn is pivotally connected to the pins 155 or 156. The pins 155 and 156 are substantially further from center (i.e., have greater eccentricity or throw) than the pins 153 and 154, but fore and aft movement of the links 163 enable enough relative lengthwise movement to compensate for the rigidity of the bars 150. The movement of each ear 161 is a perfect circle, while the movement of each ear 162 is a vertical ellipse. Thus, at the lower end of the shaker 28, the net movement is a flat ellipse 164, about 4″ to 5″, while at the top movement is a vertical ellipse 165 about 7″ to 5″. By making the link 163 relatively long and by locating the ear 162 to the rear of the crankshaft 158, the ellipse 165 at the top can be tipped back. This results (1) in a greater amplitude of shaking at the top than at the bottom, so that the shaking force increases as the vine moves up the walking arms 150, and (2) in a slightly faster movement of the vines at the top that separates the successive vines, spreading them out, helping the tomatoes to fall more easily between them and shaking them more freely by bouncing the vine as well as moving it up and down.

Preferably the forward ends 166 of the bars 150 are tilted upwardly (see FIGS. 3 and 11) and they are positioned between the finial portion 94 of the guide strips 90 so that its rubber fingers 167 rise above the strips 90 when the bars 150 reach their upper position, taking the vines off the strips 90. Then they descend below the strips 90, still in the grips 92, so that they will rise up from below and lift the next vine portion. By having the fingers 168 of this portion 166 lie at an inclination to the fingers 151 if the main portion of the bar 150, the vines are guided from the portion 94 onto the fingers 151 more gently and smoothly and with less tendency to damage the fruit. This interlocking action of the shaker 28 and elevator 27 is important, as is the tilt of the portions 166 and 167.

Also, at the rear end of the bars 150 (FIG. 11) there is preferably a terminal inclined group of fingers 168 and a smooth bar 169 that extends out therefrom a substantial distance. This structure helps to free the vine from the bars 150 and drop it into the hopper 160. For the vines have a tendency to hang on the fingers 151, and if they merely drop off such fingers it becomes difficult to disentangle them. By providing the inclined fingers 168 and the smooth bar 169, the vine is supported by the bars 169 as it leaves the fingers 151 and then 168 and it is supported as it works backward, until it falls from the smooth bars 169, without danger of the entanglement that would result from dropping from the fingers 151 directly.

It may be mentioned that the crankshafts 157 and 158 may be positioned at the ends of the bars 150 if desired, when the front ones are under the guards 94 and the rear ones near the bars 169, so that the tendency of fruit to strike the crankshafts 157 and 158 is reduced.

Figure 13:
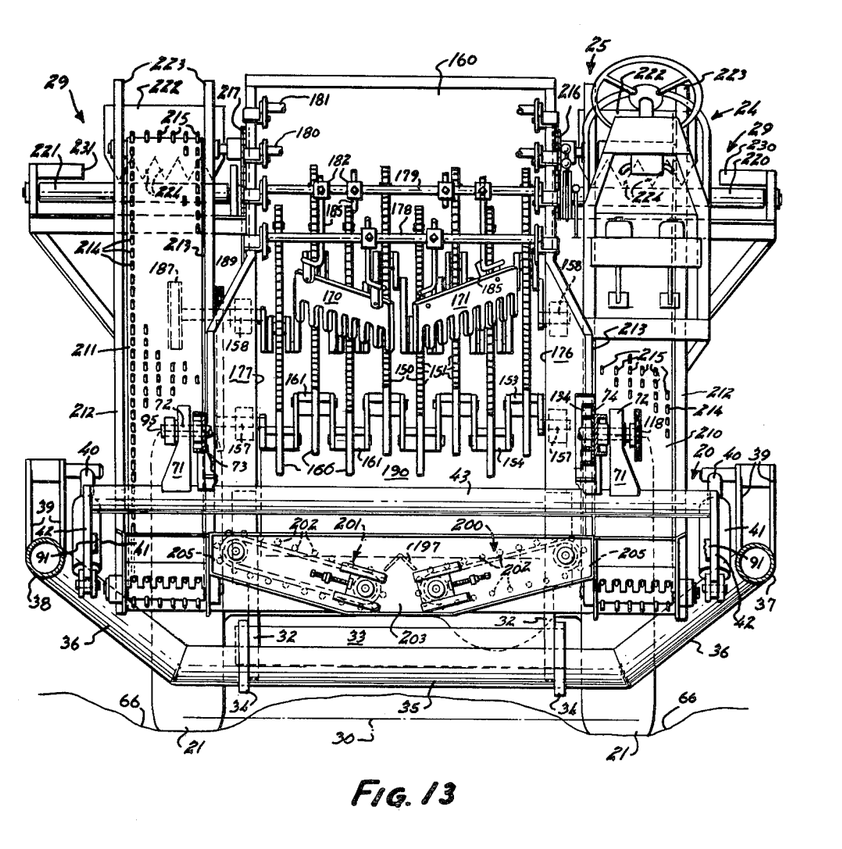
FIG. 13 is a view in front end elevation of the machine, omitting the lifting means and cutting blade, and with some parts cut away and some parts shown in section.
Figures 14, 15:
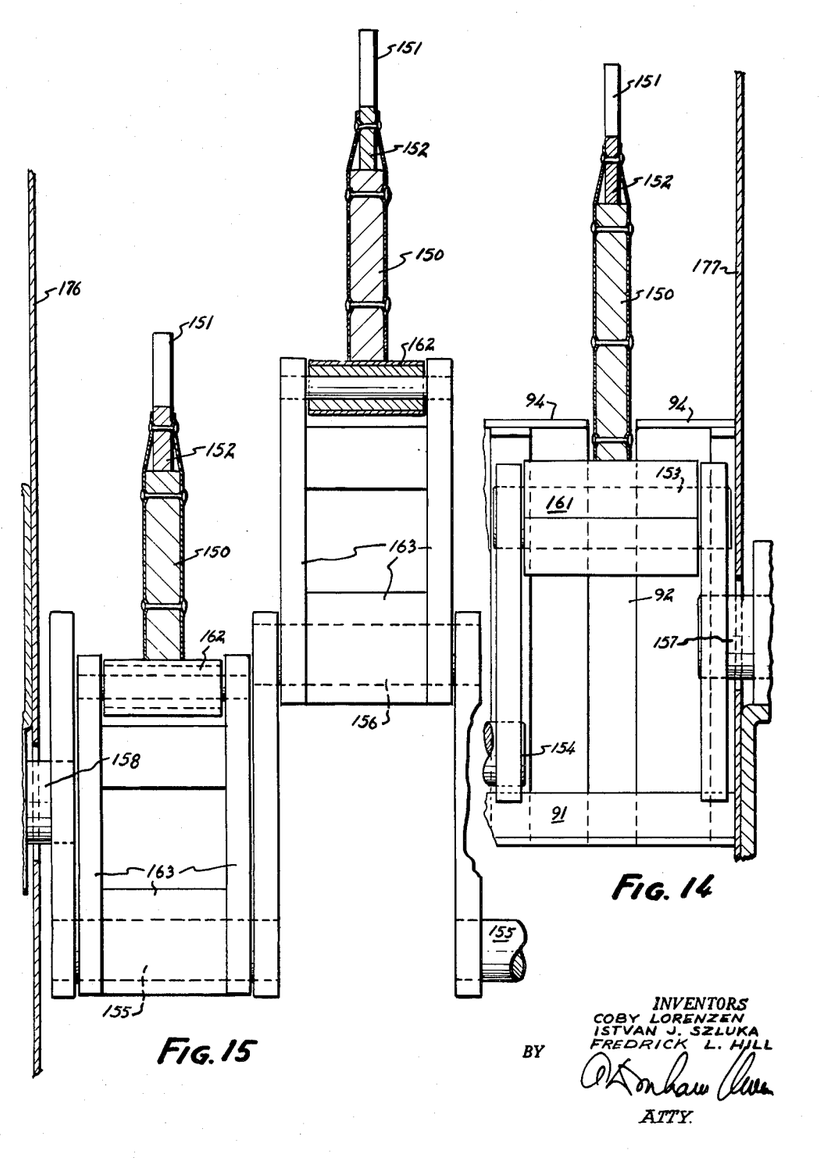
FIG. 14 is an enlarged fragmentary view in end elevation and in section of a portion of the shaking means taken along the line 14—14 in FIG. 3.
FIG. 15 is a similar view taken along the line 15—15 in FIG. 3.
Figure 16:
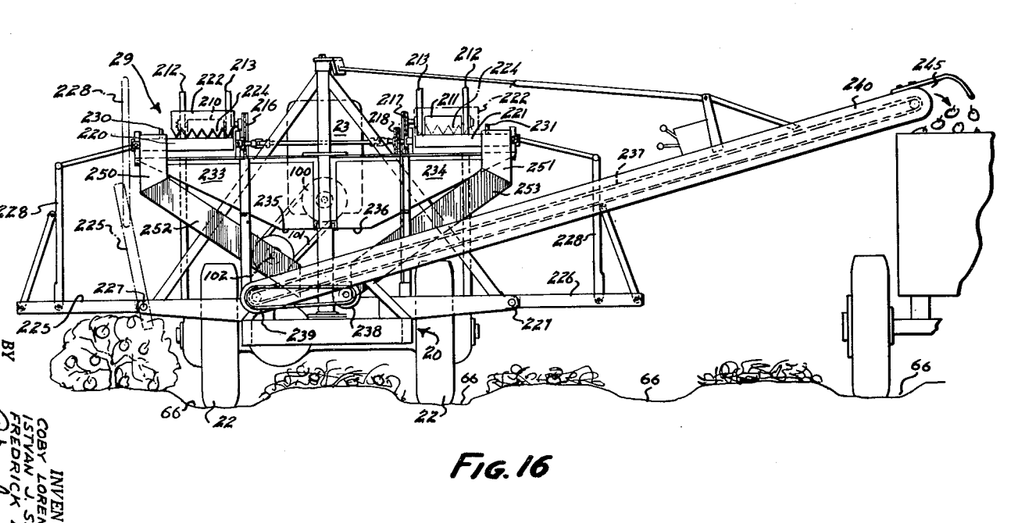
FIG. 16 is a view in rear elevation of the machine. Broken lines indicate the folded position of one platform and guard rail.
Figure 17:
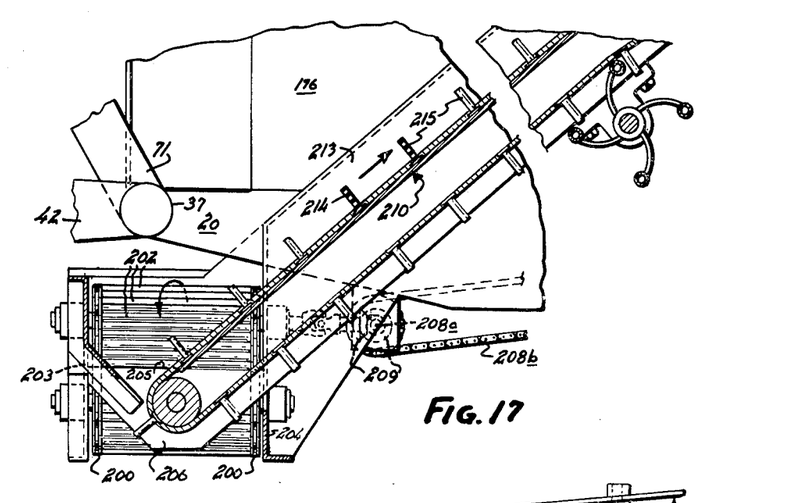
FIG. 17 is a fragmentary view in side elevation with some parts cut away and some parts shown in section, of a cross and a tomato elevating conveyor.

A further feature of the shaker 28 is its provision of a plurality of downwardly extending rubber combs 170, 171, 172, 173, 174 and 175, all having rubber teeth and resembling the bars 150 with their fingers 151 (see FIGS. 2, 3 and 13). The combs are arranged in pairs. The front combs 170 and 171 diverge from the center; the middle combs 172, 173 converge toward the center; and the last combs 174 and 175 again diverge. This has several novel actions. First, the forward combs 170 and 171 tend to spread out large vines as they enter the shaker 28 and move up on the bars 150. Next, the vines pass under the combs 170 and 171 and then boil up in the space enclosed by the combs 170, 171, 172 and 173, usually causing the vine to tumble as it moves upwardly and as it is shaken, thereby causing an acceleration and agitation. Finally, the vine is spread out again at the upper end and tumbles off into the hopper 160.

The combs 170, 171, 172, 173, 174 and 175 are supported for adjustment in various ways. The shaker 28 is bounded by vertical walls 176 and 177 at each side, across which extend four cylindrical rods 178, 179, 180 and 181, each having sleeves 182 with tubular openings 183 and clamps 184. The sleeves 182 are slidable and rotatable on the rods 178, 179, 180 and 181, for adjustment. The combs each have two upstanding rods 185 that fit in the openings 183 and their height can be adjusted. The combs 170 and 171 thus bridge the rods 178 and 179, the combs 172 and 173 bridge the rods 179 and 180, and the combs 174 and 175 bridge the rods 180 and 181. Thus any desired adjustment of angle, plane, height, and so on, can be achieved. Preferably, the combs get closer to the fingers 151 toward the rear and upper end of the shaker 28.

Various modifications may be made in the shaker 28. For example, the crankshafts 157 and 158 may have identical eccentricities, if desired, for imparting more uniform shaking action, or the eccentricity of the crankshaft 157 may be greater than that of the crankshaft 158 for imparting greater shaking action at the forward part of the machine than at the rear, wherever such structures are desirable. Moreover, half the bars 150 could be mounted along the axes of the two crankshafts, so that they could then be stationary, while alternate bars 150 could be mounted along a common axis at each crankshaft, in each instance offset from the main axis. Thus the vine would then be lifted and moved rearward once each revolution of the crank, during the interval when the moving bars are higher than the stationary bars. This would give a slower rearward movement and a different shaking action.

Still another modification would be to mount the bars 150 in three sets; on crankpins 120° out of phase, or in even more sets, or at different angles, when desired.

Figures 18, 19:
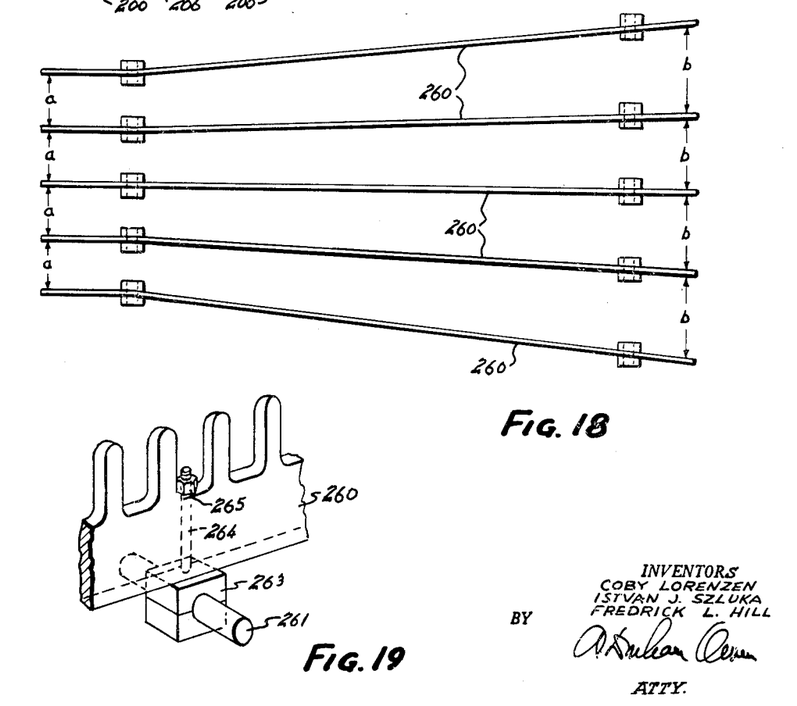
FIG. 18 is a top plan view, diagrammatic in nature, of a modified form of shaker means wherein the walking bars diverge.
FIG. 19 is an enlarged fragmentary view in perspective of the attachment of a walking bar of FIG. 18 to its crankshaft.

A further modification is illustrated in FIG. 18, where bars 260 are arranged so as to diverge from front to rear. At the front, they are spaced an equal distance $a$ apart, and at the rear they are spaced an equal distance $b$ apart, but $b$ is greater than $a$. Otherwise, the bars 260 may be like the bars 150. The bars 260 may be mounted on crankpins 261 or links 262 by the arrangement shown in FIG. 19, where a bearing 263 is clamped around the crankpin 261 or link 262 and has a vertically upwardly extending bolt 264 that extends vertically through the bar 260 and is secured to it by a nut 265. When the bars 260 are attached to their bearings 263, they are then adjusted at the proper angle for the desired divergence without affecting other phases of their operation. This structure of shaker 28 acts to spread out the vines as they are advanced, thereby aiding in freeing the tomatoes from the vines. This spreading can be very important.

*The de-leafer conveyor 190 (FIGS. 1–3 and 11–13)*

The tomatoes and some leaves, trash, dirt and debris fall down onto a conveyer belt 190 that is relatively smooth and moves rearwardly and upwardly to the hopper 160. The purpose is to have the tomatoes roll down the belt 190 to its forward end and then roll off the belt, while the dirt, leaves, trash and debris move up and off through the hopper 160.

The action here can be greatly improved by a special structure provided by this invention. While most of the dirt, debris and leaves stay with the belt 190 and move with it to the upper end into the hopper 160, some tomatoes, especially pear-shaped ones, instead of rolling properly to the bottom, tend to align themselves with the dirt, debris, and leaves and then to move to the top, where they are dumped out. In order to avoid this, the belt 190 is agitated in a special way. A pair of shafts, 191 and 192 (see FIGS. 11 and 12), positioned just below the upper run of the belt 190, are rotated at a speed considerably greater than the belt speed, depending on the natural vibration speed of the belt 190 (it may be a 2 to 1 ratio), and are provided with respective eccentrically mounted flattened portions 193, 194 and 195, 196. Preferably, the flat portion 193, 195 on one half of each shaft 191, 192 is mounted in 180° opposite eccentricity from the flat portion 194, 196 of the other half, and the two shafts 191, 192 are mounted 90° out of phase, so that the upper shaft 191 is 90° ahead of the lower shaft 192.

As a result, as the belt 190 moves upwardly, it is struck once by each flattened portion 193, 194, 195, 196 each time each shaft 191, 192 rotates. First, the upper shaft 191 rotates its flat portion 193 upwardly to raise a portion of the belt 190 up, and then 90° later the flat portion 195 on the shaft 192 strikes the belt 190. Then, 90° later, the belt 190 is struck by the upper portion 194, and finally, 90° later, the lower portion 196 strikes the belt. As a result, the belt 190 tends to cup inwardly somewhat, due to 180°-out-of-phase action of the two flat portions 193, 194 and 195, 196 on the same shaft, and to be agitated up and down, due to the 90° succession of the pairs of flattened portions 193, 195 and 194, 196 on the same side of the belt 190. By this means, even pear-shaped tomatoes can be shaken away from a generally longitudinal alignment until their main axis is generally transverse to that of the machine; then they will roll down to the bottom of the de-leafing belt 190. Thus, it has been found that this belt 190 is quite effective in separating the tomatoes from most of the dirt, debris, and leaves and, especially when properly agitated according to this invention, it also is quite eiective in causing the harvested tomatoes to roll down to the lower end of the belt 190.

*The transverse conveyors 200 and 201 (FIGS. 3, 11, 13, and 17)*

At the bottom of the belt 190, the tomatoes and such debris, dirt and trash that do gravitate down there fall onto a pair of outwardly and upwardly moving transverse conveyors 200 and 201. A sloping shield 197 bridges the gap between the conveyors 200 and 201. The conveyors 200 and 201 are preferably of an open construction, as is made by a plurality of open links 202 extending widthwise across them, and they lie between transverse vertical walls 203 and 204. These conveyors 200 and 201 thus provide a grate that gets rid of fine dirt by passing it down to the ground.

Portions of the vines, grass, clods, and other particles are sometimes brought along with the tomatoes, in spite of the action of the de-leafing belt 190. These tend to cause the various conveyors to stick. Some of them are dropped out through the links 202. In addition, at the bottom of the belt 190 there is a drop of six or eight inches onto the conveyors 200 and 201, and at the outer ends of the conveyors 200, 201 the upwardly moving flight of links 202 drops the tomatoes across a gap 205 and six or eight inches down into a well 206 at the beginning of the rearwardly moving tomato elevating conveyors 210 and 211. The gap 205 permits more dirt, etc., to fall out, and the drop results in the tomatoes, grass, vines, etc., falling free of places where they could jam between the conveyors 200, 201 and their side walls 203 and 204 or their frames.

*The power take-off 207 (FIG. 10)*

A power take-off 207 on the first transmission 103 is used to run the shaker crankshafts 157 and 158, the conveyor belts 190, 200, 201, 210, 211, 220 and 221 and also (through gears) the shafts 191 and 192, all constant speeds not related to the ground speed. This is desirable because the optimum shaking action is always attained, no matter what the ground speed. Also, the conveying action need bear no relation to the ground speed and better sorting is attained by having it constant. The vines are dropped off the shaker 28 at about the place where they were picked up, but possibly slightly forward or slightly to the rear of there. It is important that the initial lifting of elevating portion 27 move at ground speed. It is also important that the forward and rear movement of the walking bars 150, as well as their up and down movement, be kept at the speed that gives the best effect for throwing up and bouncing the vines. Similarly, the movement of the conveyors 190, 200, 201, 210, 211, 220 and 221 should be steady.

Thus, a shaft 186 is connected through suitable universal joints, etc., to the power take-off 207, and the shaft 186 drives a pulley 187, whose belt 188 drives the crankshaft 158, which drives the crankshaft 157 through a chain 189, so that they move at the same time.

The same power take-off drives the de-leafer conveyor belt 190 through a belt 198 and shaft 199. It also drives the cross conveyors 200 and 201 by belts 208, shaft 208a, chain 208b, shaft 208c, and bevel gears 209. It drives the elevator conveyors 210 and 211 through the shaft 199 and chains 216 and 217, and it drives the sorting conveyors 220 and 221 by the shaft 199 and chains 218.

*The tomato elevating conveyors 210 and 211 FIGS. (1, 2, 13, 16, 17)*

At each side of the machine from a point approximately at the juncture of the vine elevating apparatus means 27 and the shaker means 28, a pair of elevating belts 210 and 211, one on each side of the frame 20, move the tomatoes up to the sorting apparatus 29. The conveyors 210 and 211 move between stationary side walls 212 and 213 that keep the tomatoes from falling off the side, and perferably they are provided with rows 214 of upwardly projecting rubber fingers 215. The rubber fingers 215 are resilient enough not to injure properly ripe tomatoes, and they project up enough so that each row 214 provides a shelf or ledge that carries the tomatoes up. The path upward is preferably steep so that most of the dirt that gets to the belts 210, 211 tends to roll back down. At their upper end, the conveyors 211, 210 dump the tomatoes onto sorting conveyors 220, 221 at the sorting station 29.

*The sorting station 29 (FIGS. 1, 2, 13 and 16)*

As the tomatoes come up from the conveying belts 210 and 211, they again are dropped, for the same reason as before, for a six or eight inch drop onto the sorting belts 220 and 221. These are generally horizontal, though they may be tilted slightly upwardly toward the rear if desired, and they move from front to rear past the sorting station 29. After the tomatoes fall onto the belts 220 and 221, they are compelled to pass under a depending piece 222 of stiff cloth or fabric or rubber, which acts as a brake to prevent them from rolling. When they are dropped with the forwardly moving motion imparted by the conveyors 210 and 211, the tomatoes tend to roll over rapidly, sometimes for several feet before coming to a stop on the sorting belt 220 or 221. This depending member 222 is held rigidly by a frame 223 at its upper end and its serrated and flexible lower end 224 engages them and prevents them from rolling, so that they stop their roll within a few inches. It is not feasible to sort rapidly rolling tomatoes; therefore this prevention of rolling is a great help in the sorting.

A pair of platforms 225 and 226 are pivotally mounted to the frame 20 by pivot members 227. Guards 228 are pivotally mounted to the outside of the platforms 225 and 226 so that the platforms 225 and 226 and the guards 228 fold into the sides of the frame 20 when the sorting station 29 is not in use, as when the machine is being moved along a road. Two to six men stand on each platform 225, 226, so that the machine may carry from four to twelve sorters who visually sort the tomatoes.

The tomatoes may be sorted in various ways, usually into two or three groups. When they are sorted into two groups, one group comprises the satisfactory tomatoes and the others all the culls. When they are sorted into two groups, the culls are divided into green tomatoes that are satisfactory except for not being ripe and true usable culls, which comprise tomatoes having mould, or sun scald, or serious mechanical damage. Clods of dirt, pieces of vine and so on are usually sorted with the culls.

To help in the sorting, one or more partitions 239, 231 are disposed length wise over the conveyors 220, 221. When the tomatoes are sorted, the sorter simply moves culls from inside the partition 230, 231 to the outside, leaving the good tomatoes where they are.

The good tomatoes fall off the rear end of the conveyor-belt 220, 221 which moves along on top of a support tray 232, into one of two hoppers 233, 234 at the rear and roll down the hoppers 233, 234 and out through bottom openings 235, 236 onto a conveyor-belt 237, which is mounted on a boom 240. This boom 240 normally extends to one side or other of the tomato harvester frame 20 over to an adjacent row where a tractor or truck is moving along with bins to receive the tomatoes. The boom 240 is therefore a means of transferring tomatoes effectively from the machine to the collecting bin in which they are taken to the cannery. The belt 237 is driven hydraulically from the pump 65, a drive means 238, and a chain 239, and it moves upwardly and in this instance has rubber fingers 241, preferably arranged in rows 242 having the form of a V to guide them away from the vertical walls 243, 244 at the edges. This tends to cause the tomatoes to move inwardly of the belt 241 and therefore to come more in the center, away from the side guards 243, 244 where the skins could be damaged. As they move upwardly and rearwardly along the fingers 241, they eventually move off the upper end 245 of the belt 237 into the collecting bins, in which they are collected and taken away.

The culls (in this particular form only one set of culls is shown) move off the rear end of the conveyor into a separate hopper 250, 251 which moves them through a passage 252, 253 somewhat forwardly of the machine and in toward the center, and deposits them on top of the vines. They fall on and through the vines and so are shaded by the vines. This means that green tomatoes can lie, shaded by the vines, and can ripen for later hand-gleaning.

If desired, the method of the invention can be practiced a second time on the cut vines, if they are of the type which will hold on green tomatoes. In other words, in some tomatoes the green tomatoes predominantly will not be shaken off. When this is the case, a second run can be made at a suitable time, such as a week or ten days later, at which time the green tomatoes will be, on the average, sufficiently ripe to be satisfactory. When this is done, the machine operates in the same manner, except that the cutting blade performs no particular function and may, if desired, be removed.

*Operation*

Summarizing the operation, the machine is self-propelled by its engine 23 along the ground, with the wheels 21 and 22 moving at the same speed as the elevating device 27, while the shaker shafts 157, 158, the other conveyors 190, 200, 201, 210, 211, 220 221, and 237, and the shafts 191 and 192, move at constant speeds. As the harvester moves along the rows, the forward wheel 50 is in a furrow and the knife 30 close to and often below the ground. It shears off the vines, and immediately thereafter the vine is lifted by the lifting device 27. The fingers 125 which do this lifting descend generally parallel to the guide strips 90 and then are turned until, at the moment of lifting, they are substantially parallel the ground and, as they lift, they straighten around generally perpendicular to the guide strips 90. The action is performed so that the fingers 125 are moving at the same speed as the ground speed of the vehicle and, therefore, the effect on the tomatoes is merely a gently lifting of the vines, rather than any movement rearwardly or forwardly.

The vines are carried to the top of the elevating device 27 and deposited into the shaker 28. There they move along over the bars 150 while the oscillating bars 150 and fingers 151 move up and down, any adjacent pair of bars 150 moving in opposite directions at any moment. The bars 150 move the vines beneath and partially around the depending combs 170, 171, 172, 173, 174 and 175. Thus, the vines are shaken gently at first and then more vigorously. Also, the large vines tend to be moved outwardly toward the sides and spread open, and they tend to be moved past the combs 170 and 171 and then to boil up into the space between the combs 170, 171 172 and 173. Then the vines are shaken gradually greater and greater as they move toward the upper end of the shaker 28, so that all the tomatoes that are ripe are loosened therefrom. The vines are then dumped out the upper end of the shaker 28 into the hopper 160 and fall on the ground at approximately the place from which they were originally lifted.

The tomatoes that are shaken off the vines roll down the de-leafer conveyor 190 while leaves, dirt, and debris mainly move up the conveyor 190 and are dumped out into the hopper 160 with the vines. The shafts 191 and 192 beat and agitate the conveyor 190 by their eccentric flat portions 193, 194, 195 and 196, to prevent tomatoes from orienting themselves into a rut; thus they get them to roll down.

When the tomatoes reach the lower end of the de-leafer conveyor 190, they fall into the side-moving conveyors 200 and 201, whose open grate-like structures permit fine dirt and debris to fall through. The tomatoes are dropped off the ends of the conveyors 200 and 201 onto the elevating belts 210 and 211, where the fingers 215 catch them and move them up onto the sorting belts 220 and 221.

As they are dropped again onto the sorting belts 220 and 221, they are stopped from rolling by the depending braking members 22. As the tomatoes move along the sorting belts 220 and 221, they are sorted, by men standing on the platforms 225 and 226. The culls are dropped by the conveyors 220 and 221 into the hoppers 250 and 251 onto the vines, while the good tomatoes fall through the hoppers 233, 234 onto the side conveyor 237 which carries them generally parallel to the truck and upwardly into the loading bin.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a tomato harvesting machine, shaker means for separating said tomatoes from said vines, said shaker means having a pair of transverse crankshafts, each having alternate cranks diametrically opposite each other, the forward crankshaft being at a lower level than the rear cranckshaft and having a substantially shorter throw, and a plurality of walking bars mounted directly on said cranks of said forward crankshaft so that in each adjacent pair they are 180° out of phase, and a link rotatably attached to each crank of said rear crankshaft and rotatably attached to the walking bar thereof, each bar having upwardly extending fingers for shaking said tomatoes from said plants; and a plurality of combs above said walking bars, having depending fingers for retarding the movement of plants through said shaker means.

2. In a tomato harvesting machine, the combination of: a main frame; a pair of crankshafts mounted transversely on said main frame, one behind the other with the forward one lower than the rear one, the forward one having a substantially shorter throw than said rear one; a plurality of walking bars mounted to the cranks on said forward crankshaft, each bar having upwardly extending resilient fingers for engaging said plants and shaking, rolling, and bouncing them from their forward end to their rear end; and a link rotatably mounted to each said walking bar at its rear end and rotatably mounted to the cranks of said rear crankshaft for connecting each said walking bar to said rear crankshaft.

3. In a tomato harvesting machine, the shaker means for separating said tomatoes from said vines, said shaker means having a pair of transverse crankshafts, each having alternate cranks diametrically opposite each other, the forward crankshaft being at a lower level than the rear crankshaft and having a substantially shorter throw, and a plurality of walking bars mounted directly on said cranks of said forward crankshaft so that in each adjacent pair of crankshafts are 180° out of phase, each bar having upwardly extending fingers for shaking said tomatoes from said plants; and a link rotatably attached to the rear end of each said bar and to each crank of said rear crankshaft for connecting said bar and to each crank of said rear crankshaft for connecting said bars to said rear crankshaft.

4. The device of claim 3 wherein the walking bars diverge from their front ends to their rear ends.

5. In a tomato harvester machine, a plurality of alternating sets of parallel walking bars for shaking, rolling and bouncing tomato plants from a forward end to a rear end of said bars and for thereby detaching the tomatoes from the plants, means for moving at least one said set of said bars with a point adjacent each end of each bar of that set moving in a circular path, the said one set moving relative to the other bars to provide both vertical and advancing movement to the plants for shaking off said tomatoes while advancing the plants toward the rear of said bars, and means for increasing the amplitude of the shaking movement gradually as each plant moves to the rear of said bars, including means for increasing the circular path of said point adjacent to the rear end to a diameter larger than the diameter of the circular path of said point adjacent the front end, while keeping said circular paths in phase.

6. The device of claim 5 wherein each said bar has a plurality of upwardly extending projections for engaging the plants, said projections being made of elastomeric rubber material and being flexible and resilient, in order to protect the tomatoes from injury due to the shaking, rolling and bouncing that bring said tomatoes forcefully in contact with said projections.

References Cited by the Examiner

UNITED STATES PATENTS

| 340,498 | 4/86 | Eves _________________ | 130—24 |
|---|---|---|---|
| 425,444 | 4/90 | Melick _______________ | 130—26 |
| 675,221 | 5/01 | Jorgensen ____________ | 130—26 |
| 798,957 | 9/05 | Good _________________ | 130—26 |
| 848,670 | 4/07 | Meyer ________________ | 130—26 |
| 858,294 | 6/07 | Koester ______________ | 130—26 |
| 909,587 | 1/09 | Hamacek _____________ | 130—30 |
| 1,008,897 | 11/11 | Fritz _________________ | 171—27 |
| 1,486,918 | 3/24 | Plummer _____________ | 130—30 |
| 1,657,109 | 1/28 | Clemens __________ | 130—26 X |
| 2,369,723 | 2/45 | Denlinger _________ | 171—27 X |
| 2,559,965 | 7/51 | Innes ________________ | 171—27 |
| 2,974,467 | 6/58 | Long _________________ | 56—19 |
| 3,070,944 | 1/63 | Peto et al. __________ | 56—327 |
| 3,071,196 | 1/63 | Scheidenhelm _______ | 130—30 |
| 3,107,475 | 10/63 | Gustafson ___________ | 103—30 |

FOREIGN PATENTS 2,555/31  6/31  Australia.

ABRAHAM G. STONE, *Primary Examiner.*

ANTONIO F. GUIDA, T. GRAHAM CRAVER,
*Examiners.*

UNITED STATES PATENT OFFICE
CERTIFICATE OF CORRECTION

Patent No. 3,203,430                        August 31, 1965

Coby Lorenzen et al.

It is hereby certified that error appears in the above numbered patent requiring correction and that the said Letters Patent should read as corrected below.

In the grant, line 2, and in the heading to the printed specification, lines 4 and 5, for "Frederick L. Hill", each occurrence, read -- Fredrick L. Hill --; column 7, line 43, before "movement" insert -- the --; line 64, for "if" read -- of --; column 9, line 60, for "eiective" read -- effective --; column 10, line 43, after "take-off" insert -- 207 --; column 12, line 31, for "gently" read -- gentle --; column 13, line 48, for "of", first occurrence, read -- the --; lines 51 and 52, strike out "and to each crank of said rear crankshaft for connecting said bar".

Signed and sealed this 26th day of July 1966.

(SEAL)
Attest:

ERNEST W. SWIDER                          EDWARD J. BRENNER
Attesting Officer                            Commissioner of Patents